United States Patent [19]

Dickey

[11] Patent Number: 4,519,340
[45] Date of Patent: May 28, 1985

[54] ABSORBENT COMPOSITION FOR ANIMAL EXCRETA AND PROCESS FOR MAKING AND USING SAME

[75] Inventor: Patricia C. Dickey, Long Lake, Minn.

[73] Assignee: Dickey Natural Systems, Inc., Hamel, Minn.

[21] Appl. No.: 584,489

[22] Filed: Feb. 28, 1984

Related U.S. Application Data

[63] Continuation-in-part of Ser. No. 359,151, Mar. 17, 1982, abandoned.

[51] Int. Cl.$^3$ ............................................. A01K 1/015
[52] U.S. Cl. ........................................................ 119/1
[58] Field of Search ............................................ 119/1

[56] References Cited

U.S. PATENT DOCUMENTS

| | | | |
|---|---|---|---|
| 1,967,333 | 7/1934 | Smith | 119/1 |
| 2,597,457 | 5/1952 | Cook | 119/1 |
| 2,848,976 | 8/1958 | Combs | 119/1 |
| 3,066,646 | 12/1962 | Bramley | 119/28 |
| 3,735,734 | 5/1973 | Pierce et al. | 119/1 |
| 3,816,577 | 6/1974 | Neckermann et al. | 424/76 |
| 3,980,050 | 9/1976 | Neubauer | 119/1 |
| 4,038,944 | 8/1977 | Tucci | 119/1 |
| 4,206,718 | 6/1980 | Brewer | 119/1 |
| 4,217,858 | 8/1980 | Dantoni | 119/1 |
| 4,258,660 | 3/1981 | Pris et al. | 119/1 |
| 4,275,684 | 6/1981 | Krämer et al. | 119/1 |
| 4,278,047 | 7/1981 | Luca | 119/1 |

Primary Examiner—Hugh R. Chamblee
Attorney, Agent, or Firm—Merchant, Gould, Smith, Edell, Welter & Schmidt

[57] ABSTRACT

An absorbent composition for animal excreta and a process for making and using the composition including its decomposition is disclosed. The composition is made from dried, chopped corn stalks mixed with lime and an organic material having a density greater than the corn stalks selected from a group comprised of wood shavings, hulls of cereal grains, chopped soybean stalks, and chopped straw. A deodorizing substance may be added. The composition, when contaminated with animal excreta, decomposes rapidly into an organic soil.

10 Claims, 1 Drawing Figure

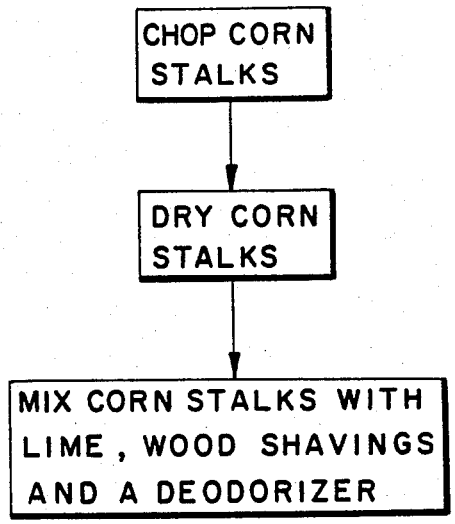

ABSORBENT COMPOSITION FOR ANIMAL EXCRETA AND PROCESS FOR MAKING AND USING SAME

This is a Continuation-In-Part of application Ser. No. 359,151, filed Mar. 17, 1982, now abandoned.

TECHNICAL FIELD

This invention relates to an absorbent composition for animal excreta and the process for making and using the absorbent composition including the organic soil decay product of the composition and the process for making the organic soil.

BACKGROUND OF THE INVENTION

An absorbent composition for animal excreta is commonly known as an animal bedding or litter. Various beddings for animals are well known. For example, generally when animals such as cows, horses, mink, rabbits, gerbils, etc. are kept in a stall or a cage, a bedding material is used to absorb and mix with the animal excreta. Also, it has not been uncommon to use a bedding material for birds such as chickens and turkeys. House animals like cats often make use of a litter material which too is an absorbent composition for animal excreta.

Although absorbent compositions are used with a variety of animals, it is useful to consider the horse industry in more detail. Interestingly, in the United States the largest horse populations are located in some of the largest human population centers, such as Los Angeles County in California and Hennepin County in Minnesota. Consequently, many horses spend a lot of time in stalls, and it is well known in the industry that stall bedding is a major problem.

There are two predominant aspects of the bedding problem—availability of the product and disposal. Many years ago, straw was used almost exclusively as a bedding material. Today, a main bedding product is wood shavings including sawdust.

Straw is no longer widely used because of both the availability and disposal problems. With the advancement of agricultural machines, straw is no longer thrashed, but combined. Combining allows the absorbent chaff from the harvested plant to be separated from the stems or straw portion. Usually the chaff is not recovered but is tilled into the soil. Consequently, the straw which is available today not only does not have the absorbency of the straw product of years ago, but is not worth recovering and selling as a bedding. Even if straw is used as a bedding, it is slow to decay and massive amounts of straw and excreta commonly build up around a stable area. Furthermore, spreading is undesirable since most stables have only pasture land into which straw does not mix or work well without specifically tilling the land which, of course, is not possible on pasture land.

Wood shavings including sawdust are recognized as being easier to use, more economical, and much easier to clean from a stall. Wood shavings, however, are a by-product of a parent industry and subject to the demands of that industry. Furthermore, disposal of the wood shavings is no less troublesome than disposal of straw. Wood is extremely slow to decompose, taking approximately six years. During this time, valuable nitrogen is robbed from the decomposition product. The resultant compost is practically valueless. If wood shavings are spread on fields or pastures, the acidity of the wood causes an unwanted eventual change in the acid level of the soil, and often, landfills do not want waste wood products because of this slow decomposition. Additionally, weed seeds tend to be prevalent in a wood based bedding. If the bedding is not composted, the weed seeds otherwise survive the bedding cycle and are planted when the used bedding is spread on the land.

Slow decomposition of piles of straw and wood products soiled with excreta has resulted in an even more unpredicted aspect of the bedding problem. For many years, stables just piled waste bedding and excreta. Major population areas now, however, have pollution control agencies which are becoming more and more concerned about such piles contaminating not only ground water, but also underground streams. Consequently, disposal of animal bedding or litter and excreta may soon be subject to regulation.

The present invention then addresses not only availability and disposal of an animal absorbent, but may well alleviate political pressure to deal with a bulk waste problem.

SUMMARY OF THE INVENTION

The present invention is directed to an absorbent composition for animal excreta comprised of chopped corn stalks.

Corn is an annular crop and thus readily renewable yearly. Although some farmers cut corn stalks and use them as a forage for cattle, most farmers simply harvest the corn and till the stalks back into the land. Since in general corn stalks have had heretofore little usefulness, there is widespread availability.

It has been found that chopped corn stalks in combination with lime and wood shavings provide an excellent bedding material. The corn stalks are pithy and highly absorbent. The wood shavings add bulk and weight to the material. Lime deodorizes and sanitizes a stall while speeding decomposition and countering the acidity of the wood shavings.

The present composition begins to decompose as soon as the natural activator, animal excreta, is mixed with it. The composition is easily spread about a stall. It is usually only necessary to remove the wet portions of the composition on a daily basis. Removed areas can be filled in with surrounding composition or new material may be added. Periodically the stall is cleaned. In any case, the used composition is aggregated for the purpose of controlled decomposition. By periodically mixing the material, an organic soil evolves within about 90 days to six months. The resultant organic soil may, of course, simply be added to the land, or it may be used in other more specialized ways such as potting for house plants.

Hence, the present composition not only provides a clean, dry bedding which is easy to maintain and handle, but also is made from an unlimited source of renewable raw material and begins to decompose as soon as animal waste is added to it with complete decomposition occurring in a relatively short period. The present composition is a breakthrough likely to be hailed by pollution control experts as a major step in the waste management problem.

BRIEF DESCRIPTION OF THE DRAWING

The sole FIGURE is a block diagram illustrating a process for making an absorbent composition in accordance with the present invention.

DETAILED DESCRIPTION OF THE INVENTION

According to the invention the absorbent composition for animal excreta comprises chopped corn stalks having particles of length usually not exceeding three inches (about 76 mm) with a moisture content no greater than approximately 20%.

Corn is an annual crop grown in large regions of the central United States and to a lesser extent in other areas. Corn is grown primarily for harvesting the kernels. The stalk is used on a limited basis as sileage for cattle or other animals although most commonly it is tilled into the ground. Corn stalks are very pithy and, when they are dired to a moisture level below 20% and preferably in the range of 12–15%, the stalks are highly absorbent. Thus, chopped or cut corn stalks comprising lengths up to approximately three inches (about 76 mm), and preferably having a distribution of lengths averaging about one half inch (about 13 mm) to one and one half inches (about 38 mm), may be spread in a stall or other area frequented by an animal for the purpose of absorbing liquid waste and mixing with solid waste. The resulting combination of corn stalks and animal excreta may be aggregated and allowed to decay into an organic soil composition.

In a further development of the invention, the absorbent may have lime mixed with the chopped corn stalks. Stable keepers have long used lime for the purpose of deodorizing and sanitizing a stall. Lime is spread about a stall floor and thrown against the walls. The lime, however, in the past has been frequently changed since if it is left in a stall for a long period, the animal urine causes the lime to cake and adhere to the stall floor. Thereafter, it must be chipped from the floor which is very time consuming and undesirable. Mixing lime with chopped corn stalks has overcome this problem in that the lime is suspended in and among the chopped corn stalks. The composition is easily removed and does not exhibit the undesirable traits as previously experienced. Additionally, lime speeds decomposition of the bedding when moistened with the urine from an animal. The composition may be comprised of as much as 20% of lime by weight, although too much lime allows lime dust to raise and adhere to an animal's coat.

In another development of the invention, an organic substance having a density greater than the cut or chopped corn stalks is added to the corn stalks and lime mixture. The organic substance may be selected from the group comprised of wood shavings or sawdust, hulls of cereal grains, chopped soybean stalks, and chopped straw. Since the purpose of the organic substance additive is to give weight to the corn stalks and lime mixture to prevent stalk particles from flying about and adhering to an animal's coat, it is understood that there may additionally be other materials which could be included in the organic substance group which would accomplish the desired purpose equally well. It is noted that chopped soybean stalks and chopped straw decompose much better than unchopped stalks or straw. In addition, lime speeds the decay process and provides a much more desirable nutrient balance for the decay product. The lime also serves the purpose of counteracting the natural acidity of especially wood shavings and maintaining a more neutral ph level. Since this function of the lime is important to the subsequent decomposition product, it is important that the quantity by weight of wood shavings or other material is not too great with respect to the lime. Acceptable ranges of substances with respect to one another by weight are at least 50% corn stalks with 55% to 65% being preferred, 5% to 20% lime with 8% to 15% being preferred, and 10% to 35% organic substance of the type indicated hereinbefore with 25% to 35% being preferred. More specifically, a six to one ratio by weight of chopped corn stalks to lime with wood shavings and lime in a three to one ratio provides an excellent composition. A five to one ratio by weight of chopped corn stalks to lime with wood shavings and lime in equal proportions has also, however, been found to yield a fine absorbent composition.

According to a further embodiment of the invention, a deodorizing substance such as orange terpines, deliminene, pine fragrance, cedar wood fragrance or other such substances or combinations of the substances, may be added to the absorbent composition to enhance its desirability. A deodorizing substance should not exceed 1% of the composition by weight. Preferably, the deodorizing substance comprises approximately one half of 1% by weight of the composition. In making the absorbent composition, the deodorizing substance is added while or after the corn stalks, lime and wood shavings are mixed.

As shown in FIG. 1, the process for making this latter embodiment of the absorbent composition comprises the steps of cutting or chopping the corn stalks, drying the corn stalks and mixing the corn stalks with lime, wood shavings, and the deodorizing substance, if a deodorizing substance is used.

In yet another development of the invention, the absorbent composition is compressed into particles not exceeding approximately two centimeters on a side and preferably somewhat smaller. In this form, the absorbent composition is particularly applicable for use as a kitty litter. Following the mixing step of the process in FIG. 1, the mixture is moistened in a stream atmosphere and compressed using a standard pelletizing machine. The composition is then dried and packaged.

The following examples describe in detail the manufacture of absorbent composition in accordance with the present invention:

EXAMPLE 1

One thousand pounds (454 kg) of corn stalks is moved into a hammermill having output openings of one half inch (1.27 cm). Thereafter, the chopped corn stalks are moved into a screen covered container or rotary dryer, and heated air is blown through the container or dryer until the moisture level of the corn stalks is tested to be less than 15 percent by weight.

EXAMPLE 2

One thousand pounds (454 kg) of corn stalks were moved into a hammermill having output openings of one half inch (1.27 cm). Thereafter, the chopped corn stalks were moved into a screen covered container, and heated air was blown through the container until the moisture level of the corn stalks was tested to be less than 15 percent by weight.

The chopped and dried corn stalks were mixed in a mixer with 200 pounds (92 kg) of lime and 200 pounds (91 kg) of wood shavings.

Five pounds (2.3 kg) of orange terpine was sprayed on the mixing composition in the mixing wagon.

EXAMPLE 3

Corn stalks are input to a hammermill having openings of one half inch (1.27 cm). The chopped corn stalks are dried to a moisture level of 15 percent by weight.

Lime and wood shavings in equal proportions are metered into a stream of chopped, dried corn stalks in a one to five proportion by weight as the composition is being input into a second hammermill having openings of one quarter inch (0.64 cm).

The composition is moistened in a steamed atmosphere and pelletized by a common pelletizing machine to a particle size of one quarter to one half inch (0.64 to 1.27 cm).

The pellets are dried for several minutes.

EXAMPLE 4

A quantity of corn stalks was moved into a hammermill having output openings of one half inch (1.27 cm) to 1 inch (2.54 cm). Thereafter, the chopped corn stalks were moved into a screen covered container, and heated air was blown through the container until the moisture level of the corn stalks was tested to be less than 15 percent by weight. Six hundred pounds (272 kg) of the chopped and dried corn stalks were mixed in a mixer with 100 pounds (45 kg) of lime and 300 pounds (136 kg) of wood shavings.

A further advantage of the present invention is that each of the embodiments of the invention may be decomposed in a controlled fashion to obtain an organic soil composition which may be spread on the land or used in other ways such as for house plant potting. When the absorbent composition is soiled with animal excreta, it is aggregated and mixed periodically for approximately 90 days to six months. It has been found that approximately 90 days is sufficient in warm climates. It is suspected, however, that longer periods are required in cooler climates. Aggregation may be accomplished by placing the material in windrows, in pits, between cement bunkers, or in various types of containers. Each aggregation mechanism should provide for aeration of the composting composition. The bacterial and chemical actions taking place during composting cause the interior portion of the aggregation to heat to a temperature of about 160° F. (71° C.). Over time bacterial action slows and the temperature drops. In order to complete the decomposition as rapidly as possible, the aggregation should be aerated whenever the temperature drops significantly, like to 50° F. to 80° F. (10° C. to 26° C.) or so, and the aggregation should be moistened whenever it dries significantly. Aeration may be simply turning the aggregation to move the outer portion of the composting composition more to the interior and vice versa.

After such decomposition period, the mixture loses its identity as an aggregate of components and becomes a soil composition having a highly nutritive chemical make-up. More particularly, the following example describes the process for obtaining the inventive soil composition:

EXAMPLE 5

The composition of Example 2 which had been mixed with animal excreta was placed in windrows of approximately three feet (91 cm) high and three feet (91 cm) wide on hard ground outdoors. The temperatures of the interior of the composition was measured daily. The temperature increased to about 160° F. (71° C.) and then decreased. Whenever the temperature decreased to about 60° F. (16° C.), the composition was rolled and mixed. After 60 days, the composition was tested and found to no longer exhibit the characteristics of the individual components, but rather to have the characteristics of a highly nutritive soil.

The present invention, therefore, is comprised of components readily available and yields a waste product which decays advantageously very rapidly, and although these numerous characteristics and advantages of the absorbent composition and organic soil composition and processes for manufacture and use have been described in detail, it is to be understood that the disclosure is illustrative only. Consequently, any changes made to the extent extended by the general meaning of the appended claims are understood to be within the principle of the invention.

What is claimed is:

1. An absorbent composition comprising chopped corn stalks having a moisture level by weight less than 20%, lime, and an organic substance cut to be no larger than said corn stalks and having a density greater than said corn stalks, said organic substance for adding weight to said chopped corn stalks for said composition, said corn stalks comprising at least 50% by weight of said composition, said corn stalks being chopped into a distribution of lengths averaging between 13 and 38 millimeters.

2. An absorbent composition in accordance with claim 1 wherein said lime by weight is no less than said organic substance.

3. An absorbent composition comprising chopped corn stalks having a moisture level by weight less than 20%, lime, and an organic substance having a density greater than said corn stalks, said organic substance for adding weight to said chopped corn stalks for said composition, said corn stalks comprising at least 70% by weight of said composition, said lime by weight being no less than said organic substance, said chopped corn stalks to lime weight ratio being approximately 5 to 1, said corn stalks having lengths not exceeding about 76 millimeters.

4. A composition in accordance with claim 3 including a deodorizing substance which comprises approximately one half of one percent by weight of said composition.

5. A process for making an absorbent composition for animal excreta comprising the steps of:
   cutting corn stalks into a distribution of lengths averaging between 13 and 38 millimeters in length;
   drying said cut corn stalks to a moisture level less than 20% by weight;
   mixing said cut and dried corn stalks with lime; and
   mixing with said cut corn stalks and lime an organic substance having a density greater than said corn stalks, said organic substance for settling said composition.

6. A process in accordance with claim 5 including the steps of mixing a deodorizing substance with said mixed corn stalks, said lime and said organic substance.

7. A process in accordance with claim 5 including the step of compressing said mixed corn stalks, said lime and said organic substance into particles no larger than approximately 2 centimeters on a side.

8. An absorbent composition for animal excreta comprising corn stalks having a moisture level by weight less than 20%, lime, and an organic substance having a density greater than said corn stalks, said organic substance having a moisture level by weight greater than 20% to inhibit dust formation, said corn stalks including particles having a distribution of lengths, said distribution having an average between 13 to 38 millimeters.

9. A composition in accordance with claim 8 wherein by weight said cornstalks are at least 50% of said composition, said lime being 5% to 20% of said composition, and said organic substance being of 10% to 35% of said composition.

10. An absorbent composition for animal excreta comprising 55% to 65% corn stalks by weight, said corn stalks having a moisture level of 12% to 15% by weight, said corn stalks having particle lengths generally less than 75 millimeters, said composition further including 8% to 15% lime by weight, said composition also including 25% to 35% organic substance by weight, said organic substance being selected from a group comprising wood shavings, hulls or cereal grains, chopped soybean stalks, and chopped straw.

* * * * *